2,950,883
SKI FOR AIRCRAFT AND THE LIKE

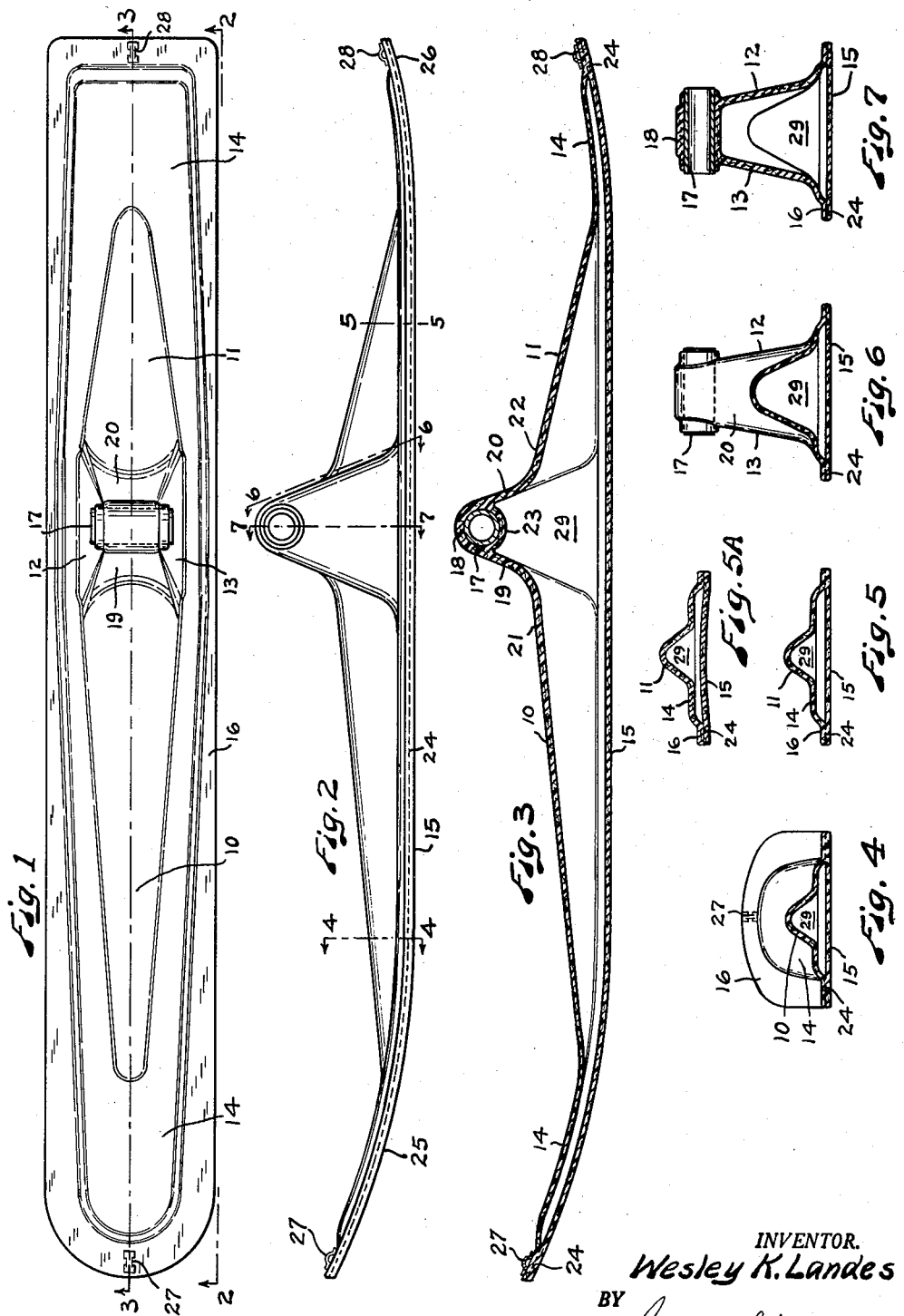

Wesley K. Landes, Box 152, Anchorage, Alaska

Filed June 14, 1955, Ser. No. 515,377

15 Claims. (Cl. 244—108)

The present invention relates to vehicular skis, and more particularly relates to vehicular skis for use on aircraft and the like, wherein improved operational characteristics are achieved by unique constructional features including a hollow pedestal and runner surface integrally fabricated from high strength, light-weight material such as hardenable synthetic resin impregnated with glass fibers, and further relates particularly to methods of manufacturing such skis.

Heretofore, known vehicular skis of the type employed on aircraft and the like under conditions where the landing areas are covered with snow and/or ice have been constructed of wood or metal or combinations thereof. Such aircraft skis customarily use a generally transversely flat wood runner to provide the runner surface, with metal being used for the snow contacting surface in many instances, and with metal also being used in certain designs to provide a stiff pedestal or bracing structure between the runner surface and the associated axle of the aircraft landing gear. Additionally, certain more recently developed conventional aircraft skis are constructed entirely of metal.

Difficulty is encountered in achieving the requisite runner strength and resiliency when wooden runners are employed, particularly under conditions of extreme cold. The natural tendency of the wooden runner to absorb moisture, which then becomes frozen in the grain of the wood and produces brittleness, presents a dangerous operational hazard, particularly in the bush-type operation commonly necessary in arctic and sub-arctic areas. Also, prior type of skis and a wooden runner having an attached sheet metal runner surface require frequent replacement and exhibit a dangerous tendency to become torn by sharp obstacles in a landing area, which tendency is effectively minimized by use of the material and construction provided according to the present invention. Because of this tendency for the moisture content of a wooden ski to freeze, and because of the low thermal insulation qualities of metal runner surfaces, both such types of conventional skis in addition develop a marked tendency to "stick" or "freeze in" in ice or snow while the aircraft is standing or maneuvering on the landing area. Such hazard and limitation on the maneuverability of an aircraft can be of serious consequence in remote areas.

When fabricated entirely of metal or from a combination of wood and metal, certain disadvantages have been encountered in such skis of conventional design, since the use of metal tends to render the skis unduly heavy and to reduce the aircraft pay load. Further, and more importantly from the point of view of operational safety, skis fabricated from metal or a combination of wood and metal are characterized by stiffness and rigidity, and consequently require that substantially all of the shock of landing be absorbed by the landing gear struts of the aircraft. Aircraft landing gear by standardized design is intended primarily for use with wheels mounting pneumatic tires. When a rigid type of ski is substituted for a pneumatic tire mounting wheel, the absence of a degree of shock cushioning action in the ski which is comparable to the cushioning action of a pneumatic tire necessarily increases the probability of failure of the landing gear under conditions of severe shock.

A primary object of the present invention is to provide an improved ski for use on aircraft and the like which eliminates or in large measure effectively minimizes the difficulties heretofore encountered in operating under conditions of severe cold, where use of wood or metal or combinations thereof has heretofore necessarily involved adoption of one or more undesirable characteristics such as undue increase in weight and stiffness, insufficient strength, a marked tendency to brittleness in severe cold, and/or "sticking" characteristics adversely affecting the maneuverability of the aircraft on the landing surface.

One object of the present invention is to provide an aircraft ski of materially reduced weight per given strength.

A further object of the present invention is to provide an aircraft-type ski of integrally bonded construction capable of sufficient strength to resist downward, transverse, and twisting stresses and strains exceeding strength requirements set forth by the Civil Aeronautics Administration, which ski is materially lighter and more durable than any conventional ski meeting comparable requirements.

Another object of the present invention is to provide an aircraft ski having an improved degree of freedom from rough surfaces, thus providing a ski with superior airflow characteristics, i.e. which is more aerodynamically "clean," in flight.

A further object of the present invention is to provide an aircraft ski impervious to the penetration of moisture and requiring, for all practical purposes, no maintenance. Another and related object of the present invention resides in provision for an aircraft ski impervious to the penetration of moisture and also having superior qualities of thermal insulation under conditions of severe cold, thus materially reducing any tendency for the ski to stick to supporting ice or snow while being maneuvered or stored under conditions of extreme cold. A further related object and advantage of the present invention is to provide an aircraft ski exhibiting the quality of maintaining requisite flexibility, i.e., no tendency toward brittleness, under conditions of severe cold.

The further and more specific object of the present invention is to provide an improved aircraft ski having an improved degree of strength and resiliency by virtue of construction providing a cushioning action between the aircraft and the landing surface. By such construction, the runner surface and upper or pedestal portion of the ski are joined only adjacent the respective edges thereof to permit both the pedestal portion and runner portion of the ski to flex under shock. A related and more specific advantage of the present invention is found in provision for a sloping pedestal portion extending from the axle bearing and diverging longitudinally of the ski a major portion of the longitudinal dimension thereof and a major portion of the transverse dimension thereof, to provide an enhanced cushioning effect between the axle bearing and the runner surface, and to provide increased strength per given weight under conditions of stress. A further related object of the present invention resides in providing a generally flat pedestal portion on the upper surface of said ski, extending from said sloping pedestal portion in directions generally parallel to and spaced from the adjacent runner surface, which generally flat pedestal portion is integrally joined to said runner surface only adjacent the edges thereof, thus imparting further resiliency and strength to the ski.

An additional object of the present invention resides in provision in an aircraft ski of means for connecting the runner surface to the axle bearing mounting pedestal portion of the ski only adjacent the edges thereof to provide a hollow core or interspace between said pedestal portion and said runner surface, and a resilient, unsupported, longitudinally extending runner central portion exhibiting the characteristic of assuming a transversely concaved configuration when supporting considerable load, as during the initial stages of landing, such configuration providing a materially improved degree of directional stability during this critical initial stage of contact of the aircraft with a landing surface. A related additional object of the present invention is found in the dynamic nature of the aforementioned transversely concave configuration of the runner surface of an aircraft ski, according to the present invention, in that under conditions of primarily static load, such concave configuration disappears and accordingly does not interfere with maneuverability of the aircraft on the landing surface after landing.

Yet another object of the present invention is to provide an improved method of fabricating an integral ski for use on aircraft and the like, wherein successive layers of a hardenable synthetic resin and high strength reinforcing fibers are built up in a depression-type mold and bonded integrally to a runner surface layer in a manner leaving a hollow core or enclosed interspace therebetween. A related object of the present invention involves a method of pigmenting the exterior surface of such a ski in a manner advantageously facilitating removal of the formed pedestal portion of the ski from the mold forming the same.

In its more general aspects, the present invention involves an aircraft ski of integral construction, the runner surface layer of the ski being bonded to the axle bearing mounting pedestal portion of the ski only adjacent the edges thereof to provide what may be termed a hollow core or enclosed interspace. More specifically, the present invention utilizes as the essential material for fabrication of the ski a moisture impervious, high strength, light weight material such as a hardenable synthetic resin advantageously having impregnated therein woven high strength glass fibers.

It has been found that such resinous material advantageously having impregnated therein such high strength fibers, provides the necessary strength, lightness in weight, flexibility, moisture imperviousness, and other desirable low temperature characteristics rendering use thereof remarkably superior in aircraft skis when constructed in the manner provided by the present invention.

The above and other objects and advantages of the present invention will be apparent from the following description of a typical example thereof, set forth by way of illustration and not limitation, wherein like numerals refer to like parts and wherein:

Figure 1 is a top plan view of an illustrative embodiment of the present invention;

Fig. 2 is a view in side elevation of the ski as illustrated in Figure 1, taken along line 2—2 thereof;

Fig. 3 is a longitudinal cross-section of the ski as illustrated in Figure 1, taken along line 3—3 thereof;

Fig. 4 is a transverse cross-section of the ski as illustrated in Fig. 2, taken along line 4—4 thereof;

Fig. 5 is a transverse cross-section of the ski as illustrated in Fig. 2, taken along line 5—5 thereof;

Fig. 5A is a view corresponding to Fig. 5, showing the concave transverse configuration of the ski runner when under dynamic load, as during the initial stages of landing;

Fig. 6 is a transverse cross-section of the ski as illustrated in Fig. 2, taken along line 6—6 thereof; and Fig. 7 is a transverse cross-section of the ski as illustrated in Fig. 2, taken along line 7—7 thereof.

Considering the above illustration of the present invention in greater detail, the top or pedestal of the ski comprising longitudinally extending sloping pedestal portions 10 and 11, transversely extending sloping pedestal portions 12 and 13, a generally flat pedestal portion 14 extending generally parallel to runner surface 15, and pedestal edge portion 16, is first fabricated in a depression-type mold, not shown (the mold configuration being considered apparent from the formed pedestal configuration), by successive build-up of an appropriate number of layers of a hardenable synthetic resin and woven glass fibers.

More specifically, the mold for the pedestal portion is first prepared in a generally conventional manner by waxing the surface thereof and spray-coating thereon a parting or release agent such as polyvinyl alcohol, the purpose of the latter being to facilitate the subsequent removal of the fabricated pedestal portion from the pedestal mold. Applied next to the mold surface is what may be termed a "gel-coat," which is a pigmented plastic in liquid form, to provide the appropriate external coloring to the fabricated ski and also provide protection for the wax and release agent applied to the mold surface, preventing attack thereof by the subsequent curing reaction of the hardenable synthetic resin formed in the mold, as hereinafter more fully set forth. After the "gel-coat" has set, a layer of hardenable synthetic resin in liquid form, such as a polyester suitably catalyzed to cure at room temperature, is applied to the "gel-coat," which layer of resinous material is followed by a layer of woven glass fibers, the layers of resinous material and woven glass fibers being applied alternately to build up the appropriate pedestal construction along the external configuration thereof, the appropriate thickness dimensions of which will be more apparent from the typical dimensions hereinafter set forth by way of example. As the pedestal portion of the ski is completed and becomes set, it is removed from the pedestal mold and a hole is drilled through each of the upper transverse sides of the central pyramidal portion thereof to accommodate the axle bearing 17. Axle bearing 17, which is desirably of hardened chrome-molybdenum alloy construction, is provided with a protective layer of resinous material, advantageously an epoxy-type resin, to accomplish a better bond of the metal surface of axle bearing 17 to the formed pedestal, which coating of resinous material has impregnated therein a layer of woven glass fibers. Following such preparation of axle bearing 17, the axle bearing 17 is bonded to the pyramidal pedestal portion with the ends thereof extending through the holes provided in said pyramidal pedestal portion, as by application of further layers of epoxy- or polyester-type resin thereto. The interior portion of the pedestal adjacent the axle bearing 17 is thereupon further strengthened by additional alternate layers of polyester-type hardenable synthetic resin and woven glass fibers to build up the thickness dimensions of the pedestal portions adjacent axle bearing 17 to the degree indicated in the illustrated embodiment of the invention, as at wall portions 18, 19, 20, 21, 22 and 23 (see Fig. 3).

Digressing to a consideration of the preparation of the surface of pedestal outer edge 16 which is subsequently bonded to the runner surface layer 15 of the ski, the surface of edge 16, after being built up to the desired thickness but before final set, has a fine weave tape impressed in the tacky surface thereof. After hardening of the resin and removal of the tape, a rough surface is presented to the subsequently applied runner surface layer 15. Such roughening of the bonding surface of edge 16 promotes cohesion and bonding of the pedestal and runner surface portions of the ski. The resulting bond is schematically indicated in dotted line at 24 on Figs. 2 through 7 for purposes of illustration and description, it being understood that such manner of fabrication results in an integral bond between said runner surface 15 and the edge portion 16 of the pedestal portion of the ski.

It will of course be also understood that the runner surface 15 of the ski will be suitably sloped upwardly at the leading and trailing ends thereof, as is conventional in the art, and as indicated at respective sloping portions 25 and 26, such configuration being accomplished by suitable pedestal and runner surface mold design, as desired.

Fabrication of the runner surface layer 15 is desirably accomplished on a generally flat mold of configuration to mate with the pedestal portion and specifically contact edge area 16 thereof, and is built up from successive layers of a suitable hardenable synthetic resin, such as a polyester resin in liquid form which is suitably catalyzed to harden at normal temperatures, such resinous material being applied in alternate layers with layers of woven glass fibers to build up the runner surface layer thickness dimension intended. When such runner surface layer thickness dimension has been attained and while the last layer thereof is still moist, the edges thereof are applied to the roughened surface of the pedestal outer edge 16 and bonded thereto under pressure to integrally form the complete ski. Finally, the lower exposed surface of runner 15 is sprayed with one or more coats of an epoxy-type resin, in the typical example of the invention set forth, to impart thereto greatly improved anti-sticking properties under snow and ice conditions, it having been found that an epoxy-type resin surface is superior to a polyester-type resin surface in this regard.

In a constructed embodiment typifying the invention as illustrated, the overall length is 72 inches and the overall width is 10 inches, with a 1¾ inch outer diameter axle bearing installed in the pyramidal portion of the pedestal portion of the ski with its center 7¾ inches above the runner external surface. The axle bearing center line is situated 43½ inches from the leading edge of the ski. Sloping pedestal portions 10 and 11 respectively extend 32 inches and 19 inches measured horizontally from the axle bearing axis, or about three-fourths of the overall ski length, and the configuration of generally flat pedestal portion 14 provides that its external upper edge is spaced between ½ inch and ¾ inch from the runner surface layer. The bonded area 16 of the pedestal portion varies in width from about 1½ inches at the leading and trailing edges of the ski to approximately ½ inch at the lateral edges thereof adjacent the axle bearing. Thickness dimensions of the laminated structure in the pedestal portion are approximately ¼ inch at points about half way along sloping portions 10 and 11, such smaller dimension continuing out to the edges of the pedestal portion. The thickness of the typical runner surface employed is approximately ³⁄₁₆ inch. Fabricated of the dimensions indicated, the ski weight is approximately 15 pounds, which factor of lightness in weight presents at least about a 40% improvement over conventional skis of comparable strength characteristics and runner surface area. A ski having the above dimensional features has been found ideally suited for use on aircraft weighing up to 1500 pounds, and does not show fracture or deformation under concentrated and distributed down loads of 8,000 pounds, and under 2200 pounds concentrated and distributed side loads, all such tests being conducted with the axle bearing in fixed position. Increasing the ski width to 11 or 12 inches and providing an increase of about 25% or 50% in the pedestal portion and runner surface thickness dimensions produces skis weighing about 18 or 22 pounds, suited for use with 2000 pound or 2500 pound aircraft, respectively. As will be apparent, proportionate variations in the specific dimensions and weights set forth readily provide skis ideally adapted for use with heavier or lighter aircraft.

Load tests have also confirmed the dynamic feature of transverse concavity of the ski under shock conditions. To test this feature, comminuted vermiculite (to simulate snow or ice) was mixed with a cementitious material, and the ski was placed in a bed of such mixture under test load sufficient to simulate shock conditions for a period permitting the cementitious material in the vermiculite to set. Following removal of the ski from the hardened supporting bed, a pronounced raised portion was clearly apparent in the bed portion under the central or unsupported portion of the ski runner surface.

A ski according to the present invention may be provided with generally conventional metal eyelets, fastened to the ski adjacent the leading and trailing edges thereof, as indicated at 27 and 28 (see Figs. 1 through 4). Thus the ski can be mounted on the aircraft according to conventional procedure, with each ski of an associated pair being mounted with its axle bearing pivotally retained on the associated axle depending from the aircraft landing gear, and with the aforesaid eyelets being connected to the aircraft by conventional flexible cable means and safety cables to limit the arc of movement of the ski.

The ski pedestal configuration presented utilizes to best advantage such inherent characteristics of strength and resiliency as are available from resinous material of the types herein disclosed. The sloping pedestal portions 10 and 11 extending for the major portion of the longitudinal dimension of the ski, and sloping portions 12 and 13 extending from bearing 17 for a major portion of the transverse dimension of the ski effectively distribute the landing shock of the aircraft from the axle bearing 17 to the runner surface 15 of the ski in a manner calculated to most evenly distribute the force of such shock over the longitudinal and transverse dimensions of the pedestal. Further, the incorporation of a generally level pedestal portion 14 extending to adjacent the edges of the runner surface layer 15 from said sloping pedestal portions 10, 11, 12 and 13 provides further effective distribution of shock to the entire runner surface. Self-evident also is the fact that the bonding of the runner surface layer 15 with the pedestal edge portion 16 extending from pedestal portion 14 provides, as more particularly shown in the cross-sectional views of Figs. 4 through 7, that the longitudinally extending central portion of runner 15 is unsupported by virtue of the resulting hollow core or interspace 29 and may flex under shock to provide a transverse concavity of the runner surface, or what may be termed a "hollow-ground" effect, as typically shown in Fig. 5A, to further cushion landing shocks and provide a material degree of directional stability during initial stages of landing of the aircraft, such action occurring when such directional stability is often most critical to landing safety. Further, notwithstanding the dynamic character of the flexing or transverse concavity so occasioned in runner surface 15, an airplane ski constructed according to the present invention is possessed of sufficient rigidity to provide an essentially flat runner surface under conditions of static load, thus not presenting the disadvantages of a permanently concaved runner surface in terms of ease of maneuverability on the landing surface during field maneuvering or storage.

It will be readily understood that a number of variations in the manner of fabrication, types of laminating materials, and in the specific dimensional considerations employed, may be undertaken within the scope of the present invention. By way of further example and not limitation in this regard, it is to be noted that other suitable hardenable synthetic resins other than a polymerizable unsaturated polyester-type resin may be employed, such as a polymerizable epoxy-type ester throughout, or such cross-linking condensation-type resins or mixtures thereof as are compatible with the strength and resiliency for the purposes indicated which may be utilized. Further, it will be understood that the high strength woven laminating material such as the woven glass fiber indicated by way of example, may have such other weave or other arrangement of the material as may be desired. Thus, in certain designs advantages will be found in utilizing glass fiber laminating layers having directional strength characteristics. Further variations in ski dimensions, laminating and bonding materials, and fabrication procedures will be apparent to those skilled in the art.

What is claimed is:

1. A ski for use on aircraft and the like, comprising a downwardly and outwardly flaring, thin-wall, pedestal of hardened synthetic resin and woven glass fiber laminated construction, and a runner having an essentially flat running surface, said runner underlying said outwardly flaring pedestal, said pedestal and said runner being substantially coextensive, the respective edge areas thereof being integrally joined.

2. An aircraft ski constructed essentially of reinforced resin and, comprising a pedestal mounting a metal axle bearing and extending longitudinally a major portion of the length of the ski, the outer edges of said pedestal being integral with a transversely flat runner, said construction providing a hollow interspace extending a major portion of the length of the ski between said pedestal and said runner.

3. An aircraft ski constructed essentially of thin-walled reinforced resin and comprising a pedestal mounting a metal axle bearing and extending longitudinally a major portion of the length of the ski and transversely a major portion of the width of the ski, the outer edges of said pedestal being integral with a generally flat runner, such construction providing an enclosed interspace between said pedestal and said runner, said interspace extending substantially the entire length and width of said ski exclusive of such bonded outer edges.

4. A ski according to claim 3, wherein the leading and trailing portions of the runner surface and pedestal of the ski slope upwardly toward the ends thereof.

5. A laminated resin and glass fiber ski for use on aircraft and the like, comprising a thin-walled pedestal mounting an axle bearing and sloping longitudinally approximately three-quarters of the length of the ski and sloping transversely a major portion of the width of the ski, the outer edges of the pedestal being substantially coextensive with and integral with a generally flat runner, such thin-walled pedestal and generally flat runner providing an enclosed interspace extending almost the entire length and width of said ski in imparting characteristics of strength, resiliency, and lightness in weight to such ski.

6. An aircraft ski of essentially reinforced resin construction, comprising a pedestal and transversely flat runner, said pedestal mounting an axle bearing and comprising sloping wall portions diverging from said axle bearing a major portion of the longitudinal dimension of said ski, said pedestal and said transversely flat runner being substantially coextensive and having only the adjacent edge areas thereof integrally joined in providing an unsupported central runner portion extending longitudinally of said ski and exhibiting in use the characteristic of assuming a transversely concave configuration when supporting considerable load, as during initial stages of landing, and assuming a flat transverse configuration under conditions of static load.

7. An aircraft ski of essentially reinforced resin construction, comprising a hollow pedestal and a transversely flat runner in providing an enclosed interspace therebetween and an unsupported runner central portion longitudinally along said ski exhibiting the characteristic of assuming a transversely concave configuration under landing shock conditions and assuming a generally flat configuration under static load conditions, such ski providing directional stability when landing an aircraft and providing an essentially flat runner surface when maneuvering the aircraft on the landing area or during storage.

8. An aircraft ski of essentially thin-walled, reinforced resin construction, comprising a thin-walled pedestal and generally flat runner, said pedestal portion mounting an axle bearing and comprising sloping portions extending from said axle bearing and diverging longitudinally of the ski a major portion of the longitudinal dimension thereof, said pedestal further comprising sloping portions extending from said axle bearing and diverging laterally of the ski a major portion of the transverse dimension thereof, said sloping pedestal portions extending at the diverging edges thereof into a generally flat pedestal portion on the upper surface of said ski, said generally flat pedestal portion being generally parallel to and spaced above the runner, the edge area of said generally flat pedestal portion being integrally joined to the edge area of said runner and serving to aid in cushioning said axle bearing from shock encountered by said runner.

9. A ski for use on aircraft and the like, comprising a high-strength metal axle bearing mounted in a hollow pedestal sloping downwardly and outwardly from said bearing in directions both longitudinally and transversely of said ski, said pedestal being provided with a runner surface, said ski construction exclusive of said metal axle bearing consisting of thin-walled synthetic resin and glass fiber laminate.

10. An aircraft ski of laminated integral construction, comprising a hollow pedestal and a runner having a normally flat running surface, transversely considered, said pedestal mounting a metal axle bearing, the said ski exclusive of said metal axle bearing being fabricated from moisture impervious, high strength, light weight, hardened synthetic resin impregnating and having laminated therein woven high strength glass fibers.

11. A ski according to claim 10, wherein said hardened synthetic resin is of the polyester type.

12. An aircraft ski, comprising an integrally bonded pedestal and landing surface contacting transversely flat runner, said pedestal mounting an axle bearing and comprising sloping portions extending for a major portion of the longitudinal and transverse dimensions of said ski, said pedestal and said runner being of thin-walled reinforced resin, each being bonded to the other at the outer edges thereof, said runner comprising an epoxy-type resin exterior surface effectively reducing friction between said exterior surface and snow and ice encountered in an aircraft landing or storage areas.

13. A ski according to claim 12, further comprising a pigmented plastic outer coating on the exterior of said pedestal.

14. An aircraft ski constructed essentially of reinforced resin and comprising a pedestal portion and a normally transversely flat runner joined to said pedestal portion only adjacent the respective edges thereof, said pedestal portion flaring outwardly toward said edges for most of the length dimension and most of the width dimension of said ski and being spaced from and generally parallel to said ski runner in the area of said pedestal portion for a substantial dimension next to said joined edges.

15. A ski according to claim 14, having an upwardly curved leading tip section, the said pedestal portion extending into said tip portion and being spaced from and substantially parallel to said runner throughout most but not all of said upwardly curved tip section.

References Cited in the file of this patent

UNITED STATES PATENTS

| | | |
|---|---|---|
| 1,784,274 | Cotton | Dec. 9, 1930 |
| 1,891,188 | Stalb | Dec. 13, 1932 |
| 2,259,804 | Davis et al. | Oct. 21, 1941 |
| 2,417,586 | Crosley | Mar. 18, 1947 |
| 2,539,817 | Ditter | Jan. 30, 1951 |
| 2,625,350 | Ditter | Jan. 13, 1953 |
| 2,688,580 | Fingerhut | Sept. 7, 1954 |
| 2,695,178 | Rheinfrank | Nov. 23, 1954 |
| 2,773,792 | Nebesar | Dec. 11, 1956 |
| 2,805,974 | Brucker | Sept. 10, 1957 |

FOREIGN PATENTS

| | | |
|---|---|---|
| 1,090,667 | France | Oct. 20, 1954 |

OTHER REFERENCES

"Modern Plastics," November 1950, p. 113.